(12) United States Patent
Hsu et al.

(10) Patent No.: US 9,760,193 B2
(45) Date of Patent: Sep. 12, 2017

(54) COMPOSITE SUBSTRATE STRUCTURE AND TOUCH PANEL HAVING THE SAME

(71) Applicant: TPK TOUCH SOLUTIONS (XIAMEN) INC., Xiamen (CN)

(72) Inventors: I-Chung Hsu, Taipei (TW); Kuo-Shu Hsu, Taipei (TW); Chunyong Zhang, Xiamen (CN); Yuchuan Wu, Yongding (CN); Bangxiong Huang, Xiamen (CN); Binghui Chen, Xiamen (CN)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 0 days.

(21) Appl. No.: 14/623,521

(22) Filed: Feb. 17, 2015

(65) Prior Publication Data
US 2015/0248182 A1  Sep. 3, 2015

(30) Foreign Application Priority Data

Feb. 28, 2014 (CN) .......................... 2014 1 0072041
Oct. 24, 2014 (CN) .......................... 2014 1 0576661

(51) Int. Cl.
*G06F 3/044* (2006.01)
*B32B 18/00* (2006.01)
*G06F 3/041* (2006.01)

(52) U.S. Cl.
CPC ........ *G06F 3/041* (2013.01); *B32B 2307/412* (2013.01); *B32B 2307/73* (2013.01); *B32B 2457/00* (2013.01); *G06F 2203/04103* (2013.01); *Y10T 428/24942* (2015.01); *Y10T 428/26* (2015.01); *Y10T 428/30* (2015.01)

(58) Field of Classification Search
CPC ................... G06F 3/044; G06F 3/041; G06F 2203/04112; G06F 2203/04103; B32B 18/00; B32B 2307/73; B32B 2307/412; B32B 2457/00; Y10T 428/26; Y10T 428/30; Y10T 428/24942
See application file for complete search history.

(56) References Cited

U.S. PATENT DOCUMENTS 5,268,217 A * 12/1993 Kimock .................. B32B 17/06
  428/216
6,160,769 A * 12/2000 Ohnuki .................. B82Y 10/00
  369/13.13

(Continued)

FOREIGN PATENT DOCUMENTS

CN    102529214 A    7/2012
CN    102729566 A   10/2012

(Continued)

*Primary Examiner* — Amare Mengistu
*Assistant Examiner* — Jennifer Zubajlo
(74) *Attorney, Agent, or Firm* — Cooper Legal Group, LLC (57) ABSTRACT

The present disclosure provides a composite substrate structure and a touch panel having composite substrate structure, for promoting abrasion resistance, visual transparency, and appearance. The composite substrate structure includes a transparent substrate, a hydrophobic layer disposed on the transparent substrate, and a diamond-like carbon layer disposed between the transparent substrate and the hydrophobic layer, wherein the hydrophobic layer has a coefficient of static friction less than or equal to about 0.1.

20 Claims, 5 Drawing Sheets

(56) References Cited

U.S. PATENT DOCUMENTS

| | | | |
|---|---|---|---|
| 6,812,082 B2 * | 11/2004 | Hirakata | G02F 1/136227 257/E27.111 |
| 2011/0081769 A1 * | 4/2011 | Takemura | H01L 27/1214 438/463 |
| 2012/0080767 A1 * | 4/2012 | Horikoshi | H01L 27/146 257/443 |
| 2012/0164454 A1 * | 6/2012 | Sung | C23C 16/26 428/408 |
| 2012/0263936 A1 * | 10/2012 | Krzyak | C03C 17/3417 428/304.4 |
| 2013/0164543 A1 | 6/2013 | Shibuya et al. | |

FOREIGN PATENT DOCUMENTS

| | | |
|---|---|---|
| CN | 102770219 A | 11/2012 |
| JP | 2000238165 A | 9/2000 |
| JP | 2009013384 A | 1/2009 |
| JP | 2009114478 A | 5/2009 |
| JP | 2011104909 A | 6/2011 |
| JP | 2012239975 A | 12/2012 |
| JP | 5270810 B1 | 8/2013 |
| JP | 2015165401 A | 9/2015 |
| KR | 1020060072099 A | 6/2006 |
| KR | 1020120018059 A | 2/2012 |
| TW | M499601 U | 4/2015 |
| WO | 2005001525 A1 | 1/2005 |
| WO | 2012133367 A1 | 10/2012 |

* cited by examiner

COMPOSITE SUBSTRATE STRUCTURE AND TOUCH PANEL HAVING THE SAME

BACKGROUND OF THE INVENTION

This Non-provisional application claims priority on Patent Application No. 201410072041.1 filed in People's Republic of China on Feb. 28, 2014 and No. 201410576661.9 filed in People's Republic of China on Oct. 24, 2014, the entire contents of which are hereby incorporated by reference.

Field of the Invention

The present disclosure relates to a promoted substrate structure, and in particular, to a composite substrate structure applied to a touch panel.

Description of Related Art

Touch panels are widely implemented in electronic devices as user interface technology advances. For example, smart phones, tablet computers, cameras, e-book readers, MP3 players and other portable electronic products widely include touch panels applied to display screens thereof as an operational control apparatus.

When operating a product having a touch panel, the user typically uses his/her finger or a stylus to contact the surface of a substrate of the touch panel, and a pressing or a sliding of the finger or stylus is conducted on the surface of the substrate. Some substrates are transparent, while others are semitransparent or opaque.

SUMMARY OF THE INVENTION

The present disclosure provides a composite substrate structure and a touch panel having composite substrate structure, for promoting abrasion resistance of the surface of a transparent substrate through the composite structure having a diamond-like carbon layer and hydrophobic layer on the surface thereof.

According to one exemplary embodiment of the instant disclosure, a composite substrate structure includes a transparent substrate, a hydrophobic layer disposed on the transparent substrate, and a diamond-like carbon layer disposed between the transparent substrate and the hydrophobic layer, wherein the hydrophobic layer has a coefficient of static friction less than or equal to about 0.1.

According to another exemplary embodiment of the instant disclosure, a touch panel having composite substrate structure includes a transparent substrate, which has a first face and a second face parallel to the first face, a diamond-like carbon layer disposed on the transparent substrate and positioned on the first face, a hydrophobic layer disposed on a side of the diamond-like carbon layer opposite to the transparent substrate, and a touch control unit disposed under the second face of the transparent substrate, wherein the hydrophobic layer has a coefficient of kinetic friction less than or equal to about 0.1 with respect to a dustless cloth.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

It is to be noted that, in the descriptions, the word "upper", "lower", "above", and "under" are provided for purpose of illustration and description and relative positions of the components only. It is not intended to be exhaustive or limiting to the precise form disclosed. With respect to the accompanying drawings, upper of the composite substrate structure is relatively closer to the user, while lower of the composite substrate structure is relatively further from the user.

Figure 1:
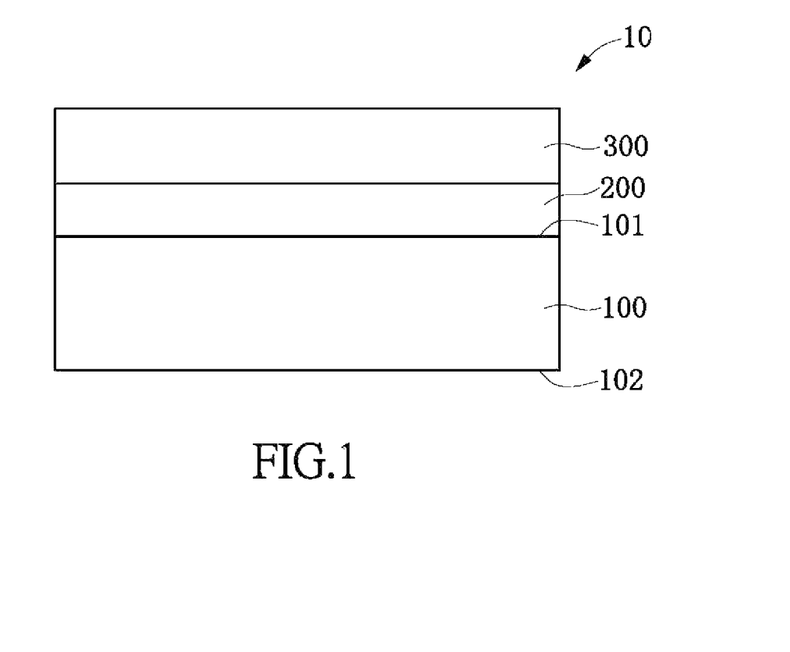
FIG. 1 shows a cross-sectional view of a composite substrate structure according to one or more embodiments of the present disclosure.

Please refer to FIG. 1 for an explanation of a composite substrate structure according to the present disclosure. FIG. 1 shows a cross-sectional view of a composite substrate structure according to one or more embodiments of the present disclosure. As shown in FIG. 1, the composite substrate structure 10 includes a transparent substrate 100 having a first face 101 and a second face 102 opposite to the first face 101. The first face 101 and the second face 102 are arranged substantially parallel to each other. In some embodiments, the transparent substrate 100 is made of insulating and visually transparent materials. In some embodiments, the transparent substrate 100 is formed of a material including ethylene terephthalate, polyether sulfone, polyacrylate, polyethylene naphthalate, polyethylene terephthalate, polyphenylene sulfide, polyallylate, polycarbonate, polyethylene terephthalate polyethylene terephthalate or glass. In some embodiments, the transparent substrate 100 is a stiff plate or a pliable plate. In some embodiments, the transparent substrate 100 is a flat board, a curved board, or in different shapes. In at least one embodiment, the transparent substrate 100 is a flat board.

The composite substrate structure 10 further includes a diamond-like carbon layer 200 formed on the transparent substrate 100. The diamond-like carbon layer 200 is positioned on the first face 101, and the present disclosure is not limited thereto. In some embodiments, the diamond-like carbon layer 200 is disposed merely on one surface of the transparent substrate 100 or on a plurality of surfaces of the transparent substrate 100.

The diamond-like carbon layer 200 of the composite substrate structure 10 is configured to meet various objectives. At least two considerations are contemplated herein.

First, the diamond-like carbon layer 200 can have $sp^2$ bond graphite structures and $sp^3$ bond diamond cubic structures. The $sp^3$ bonds diamond cubic structure has better hardness, better scratch resistance, and better wear resistance, while also having relatively high internal stress and weak bonding force with the transparent substrate 100. Consequently, a higher $sp^3$ bond-containing diamond-like carbon layer 200 may have poor adhesion with respect to the transparent substrate 100. Thus, the process of forming a diamond-like carbon layer 200 on the transparent substrate 100 promotes the adhesion of the diamond-like carbon layer 200 with respect to the transparent substrate 100. For example, the thickness of the diamond-like carbon layer 200 formed on the transparent substrate 100 is decreased to reduce the internal stress thereof.

Second, considering the visual transparency of the diamond-like carbon layer 200, the $sp^2$ bond graphite structure has a greater impact on the optical properties of the diamond-like carbon layer 200 than the $sp^3$ bond diamond cubic structure does. Specifically, the more graphite structures having $sp^2$ bonds contained in the diamond-like carbon layer 200, the poorer the visual transparency of the diamond-like carbon layer 200 is. The fewer graphite structures having $sp^2$ bonds contained in the diamond-like carbon layer 200, the better the visual transparency of the diamond-like carbon layer 200 is.

Therefore, to optimize the adhesion and the visual transparency, it is preferred that the diamond-like carbon layer 200 has thickness less than or equal to about 15 nanometers and has a content percentage of $sp^3$ bonds greater than or equal to about 15%. The content percentage of $sp^3$ bonds of the diamond-like carbon layer 200 is, as a specific example, about 30% or about 50% according to needs.

In some embodiments, the diamond-like carbon layer 200 according to the present disclosure is formed on the surface of the transparent substrate 100 by sputtering. The content percentage of $sp^3$ bonds in the diamond-like carbon layer 200 is regulated by controlling the flow rate of hydrogen and the dissociation energy. The diamond-like carbon layer 200 formed by sputtering can have a content percentage of $sp^3$ bonds greater than or equal to about 15% when the flow rate of hydrogen is controlled to greater than 12 sccm (standard cubic centimeter per minute) and the dissociation energy is controlled to 100 to 700 eV (electron volt).

It is worth mentioning that, in addition to the visual transparency and the adhesion, according to the present disclosure, there are further considerations directed to the visual effect of the composite substrate structure 10.

The visual effect of the composite substrate structure 10 is related at least to the thickness of the diamond-like carbon layer 200. Experimental results show that the greater the thickness of the diamond-like carbon layer 200 of the composite substrate structure 10, the poorer the visual transparency of the composite substrate structure 10, and the more apparent the appearance of yellow color, which is known as a yellowing phenomenon in the related field. The yellowing phenomenon is seen by a naked eye if the thickness of the diamond-like carbon layer 200 is increased to greater than about 10 nanometers. The yellowing phenomenon is so serious that the visual effect of the composite substrate structure 10 is affected, if the thickness of the diamond-like carbon layer 200 is increased to greater than about 15 nanometers.

Therefore, considering the visual transparency, the adhesion, and the yellowing phenomenon, in some embodiments, the diamond-like carbon layer 200 has a preferred thickness of less than about 10 nanometers. In other preferred embodiments, the diamond-like carbon layer 200 can have a thickness ranging from about 2 nanometers to about 5 nanometers, resulting in a transparency of the composite substrate structure 10 greater than about 89%, and enabling optimization of the visual effect and the adhesion property of the composite substrate structure 10. Transparency here and in the following is described as the amount of light transmitted divided by the amount of incident light times 100%, where the wavelength of the incident light is about 550 nanometers.

The composite substrate structure 10 further includes a hydrophobic layer 300 disposed at a side of the diamond-like carbon layer 200 opposite to the transparent substrate 100. A surface of the hydrophobic layer 300 opposite to the diamond-like carbon layer 200 has a contact angle greater than 110 degrees. Thus, at the side opposite to the diamond-like carbon layer 200, the entire surface of the hydrophobic layer 300 can exhibit a preferred hydrophobic property. Experimental results show that when the contact angle of a surface of an object is greater than 90 degrees, the surface of the object seemingly repels a mass of liquid, such that liquid does not easily wet the object and moves easily on the surface thereof. In some embodiments, the material of the hydrophobic layer 300 includes a compound containing at least one of the elements fluorine, nitrogen or oxygen, for improving the hydrophobicity of the composite substrate structure 10.

The following describes a first scratch resistance and wear resistance test carried out on the composite substrate structure 10 having the hydrophobic layer 300 and a composite substrate structure without a hydrophobic layer 300, respectively.

Experiment Conditions:

Use a 2 cm by 2 cm friction head wrapped with an ultra-fine steel wool under a force of 70N for testing.

Experimental Results:

The composite substrate structure 10 having the hydrophobic layer 300 has better scratch resistance and wear resistance than the composite substrate structure without a hydrophobic layer 300.

Experimental Results Show:

The composite substrate structure 10 having the hydrophobic layer 300 has a coefficient of surface friction less than that of the composite substrate structure without a hydrophobic layer 300. The scratch resistance and the wear resistance of the composite substrate structure 10 are related to the coefficient of surface friction. Specifically, the greater the coefficient of surface friction of the composite substrate structure 10, the poorer the scratch resistance and the wear resistance; the less the coefficient of surface friction of the composite substrate structure 10, the better the scratch resistance and the wear resistance.

Accordingly, the hydrophobic layer 300 improves the hydrophobicity of the composite substrate structure 10, thus preventing the surface of the composite substrate structure 10 from attracting oil or water. In addition, the composite substrate structure 10 having the hydrophobic layer 300 has a smaller coefficient of surface friction, resulting in fewer scratches and less wear when the composite substrate structure 10 is subjected to an external scratching force.

The greater the content percentage of hydrophobic atoms in the hydrophobic layer 300, the better the hydrophobicity of hydrophobic atoms in the hydrophobic layer 300, and thus the smaller the coefficient of surface friction. According to one or more embodiments of the present disclosure, the hydrophobic layer 300 has a content percentage of hydrophobic atoms (such as fluorine) greater than about 50%.

Moreover, it has been found in the actual production process that, the coefficient of surface friction of the hydrophobic layer 300 is related to a proportion of carbon-fluorine bonds to silicon-oxygen bonds therein.

The following describes a second scratch resistance and wear resistance test carried out on the composite substrate structure 10 having the hydrophobic layer 300 with various proportions of carbon-fluorine bonds to silicon-oxygen bonds therein.

Experiment Conditions:

Dispose a dustless class 100 cloth on the composite substrate structure, and then dispose a 200-gram weight on the dustless cloth. Perform the scratch resistance and wear resistance test under a velocity of 100 mm/min for the composite substrate structure.

Experimental Results:

The composite substrate structure 10 with a proportion of carbon-fluorine bonds to silicon-oxygen bonds greater than or equal to 50:1 in the hydrophobic layer 300 has a coefficient of static friction less than or equal to about 0.1. The surface of the hydrophobic layer 300 has a preferred smoothness, and the scratch resistance and wear resistance thereof are improved.

Experimental Results Show:

The hydrophobic layer 300 improves the surface smoothness of the composite substrate structure 10, thus enhancing the scratch resistance and the wear resistance of the composite substrate structure 10 when subjected to an external scratching force.

In some embodiments of the present disclosure, the hydrophobic layer 300 can become crystalline by a baking process or the like. In the hydrophobic layer 300 formed by a baking process, molecules are arranged in a highly ordered microscopic structure, such that the hydrophobic layer 300 can have a preferred density. The density of the hydrophobic layer 300 is greater, and the coefficient of friction of the hydrophobic layer 300 is more stable and keeps a low value. The composite substrate structure 10 with the hydrophobic layer 300 that has a crystal proportion greater than about 50% can have a significantly improved scratch resistance or wear resistance.

Moreover, the greater the thickness of the hydrophobic layer 300, the poorer the visual transparency thereof. To optimize the hydrophobicity and the visual transparency, it is preferred that the hydrophobic layer 300 has a thickness ranging from about 5 nanometers to about 30 nanometers.

Figure 2:
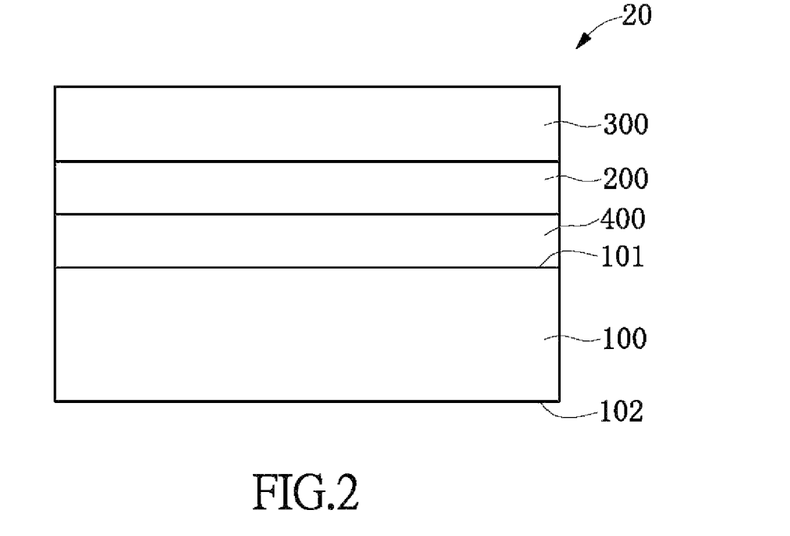
FIG. 2 shows a cross-sectional view of the composite substrate structure according to some embodiments of the present disclosure.

Refer to FIG. 2, which shows a cross-sectional view of the composite substrate structure according to one or more embodiments of the present disclosure. Components similar to those of FIG. 1 are not described further. In some embodiments, the composite substrate structure 20 further includes an adhesive layer 400 disposed between the transparent substrate 100 and the diamond-like carbon layer 200, and the adhesive layer 400 includes a silicon-based material. In some embodiments, the adhesive layer 400 is configured for enhancing the bonding between the diamond-like carbon layer 200 and the transparent substrate 100. Specifically, the silicon atoms in the adhesive layer 400 can move into the silica network structure of the transparent substrate 100 (such as a glass substrate) and also can move into the carbon-hydrogen mesh structure in the diamond-like carbon layer 200, which facilitates the bonding exchange between the transparent substrate 100 and the diamond-like carbon layer 200, thus to increase the adhesion there between. In an exemplary embodiment, the adhesive layer 400 is a silicon dioxide layer, and the present disclosure is not limited thereto.

In some embodiments, on the one hand, through the disposed adhesive layer 400, delamination caused by inner stress due to the difference of compositions between the diamond-like carbon layer 200 and the transparent substrate 100 is avoided, whereby the diamond-like carbon layer 200 is firmly bonded to the transparent substrate 100. On the other hand, the adhesive layer 400 (such as silicon dioxide), which is formed with fine particles, may also provide a surface of preferred flatness for the subsequent lamination of the diamond-like carbon layer 200.

Figure 3:
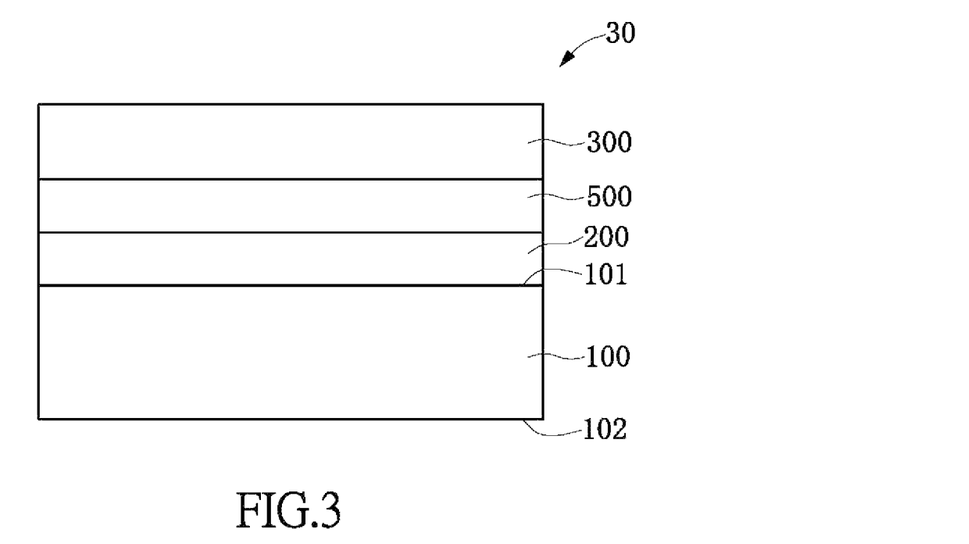
FIG. 3 shows a cross-sectional view of the composite substrate structure according to some embodiments of the present disclosure.

Refer to FIG. 3, which shows a cross-sectional view of the composite substrate structure according to one or more embodiments of the present disclosure. Components similar to those of FIG. 1 or FIG. 2 are not further described. In some embodiments, the composite substrate structure 30 further includes a middle layer 500 disposed between the diamond-like carbon layer 200 and the hydrophobic layer 300. For example, the middle layer 500 is formed of a silicon carbon based material. The middle layer 500 has a content percentage of silicon atoms ranging from about 10% to about 20% and a content percentage of carbon atoms ranging from about 80% to about 90%.

In some embodiments, through the middle layer 500, the bonding interface between the middle layer 500 and the diamond-like carbon layer 200 and the bonding interface between the middle layer 500 and the hydrophobic layer 300 can have similar atomic structures, whereby the hydrophobic layer 300 is firmly bonded to the diamond-like carbon layer 200. In addition, delamination caused by inner stress due to the difference of compositions between the diamond-like carbon layer 200 and the hydrophobic layer 300 is avoided.

Moreover, the greater the thickness of the middle layer 500, the poorer the visual transparency of the composite substrate structure 30. To optimize the visual transparency and the adhesion of the composite substrate structure 30, it is preferred that the middle layer 500 have a thickness ranging from about 10 nanometers to about 13 nanometers.

Figure 4:
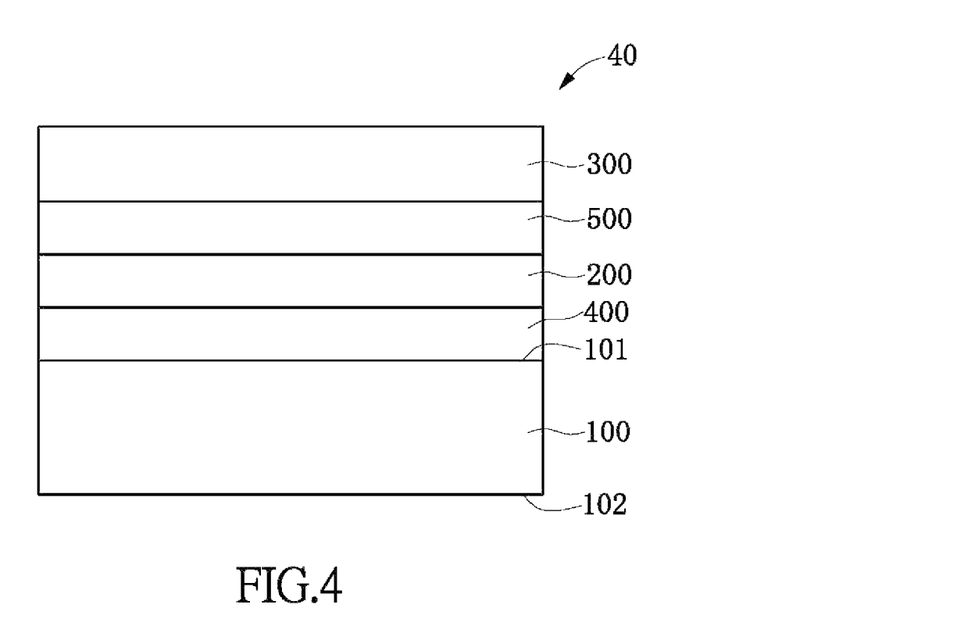
FIG. 4 shows a cross-sectional view of the composite substrate structure according to some embodiments of the present disclosure.

Refer to FIG. 4, which shows a cross-sectional view of the composite substrate structure according to one or more embodiments of the present disclosure. Components similar to those of FIG. 1, FIG. 2 or FIG. 3 are not further described. In some embodiments, the composite substrate structure 40 further includes an adhesive layer 400 disposed between the transparent substrate 100 and the diamond-like carbon layer 200.

Figure 5:
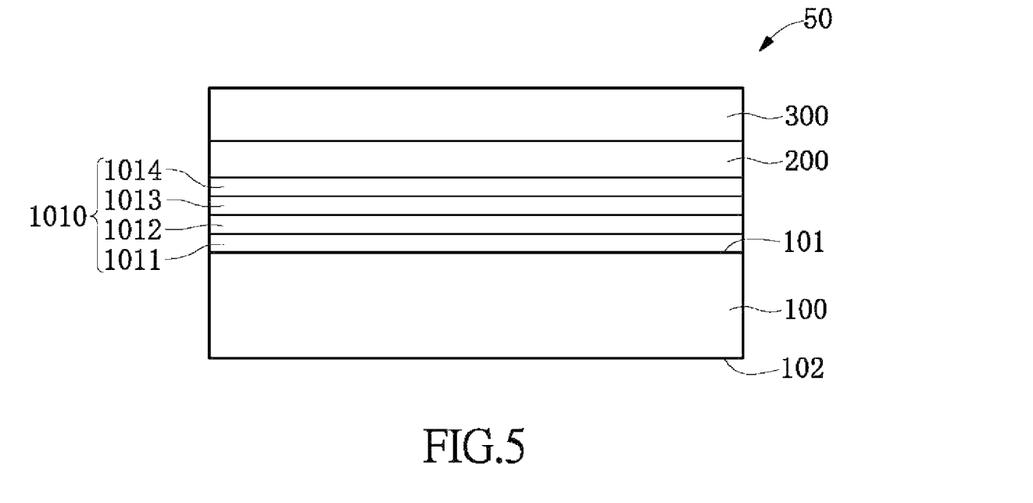
FIG. 5 shows a cross-sectional view of the composite substrate structure according to some embodiments of the present disclosure.

Refer to FIG. 5, which shows a cross-sectional view of the composite substrate structure according to one or more embodiments of the present disclosure. Components similar to those of FIG. 1, FIG. 2, FIG. 3 or FIG. 4 are not further described. In some embodiments, the composite substrate structure 50 further includes an anti-reflection film 1010 disposed between the transparent substrate 100 and the diamond-like carbon layer 200. The anti-reflection film 1010 may include a plurality of first anti-reflection layers 1011, 1013 and a plurality of second anti-reflection layers 1012, 1014. The first anti-reflection layers 1011, 1013 and the second anti-reflection layers 1012, 1014 are alternately laminated. For example, in the direction extending outwardly from the transparent substrate 100, a first anti-reflection layer 1011, a second anti-reflection layer 1012, a first anti-reflection layer 1013, and a second anti-reflection layer 1014 are sequentially laminated. In some embodiments, the anti-reflection film 1010 includes two first anti-reflection layers and two second anti-reflection layers, but the present disclosure is not limited thereto. For example, the number of the first anti-reflection layers or the number of the second anti-reflection layers is three, four, or greater than four. It is noted that, the number of the first anti-reflection layers corresponds to the number of the second anti-reflection layers, and the first anti-reflection layers and the second anti-reflection layers each are alternately laminated.

In some embodiments, in the anti-reflection film 1010 disposed between the transparent substrate 100 and the diamond-like carbon layer 200, a first anti-reflection layer 1011 is arranged adjacent to the transparent substrate 100, and a second anti-reflection layer 1014 is arranged adjacent to the diamond-like carbon layer 200. The second anti-reflection layers 1012, 1014 each have a refractive index less than that of each of the first anti-reflection layers 1011, 1013. For example, the first anti-reflection layers 1011, 1013 each have a refractive index greater than about 1.6, and the second anti-reflection layers 1012, 1014 each have a refractive index less than about 1.55. In some preferred embodiments, the first anti-reflection layers 1011, 1013 each have a refractive index greater than about 1.8, and the second anti-reflection layers 1012, 1014 each have a refractive index less than about 1.5.

In some embodiments, The first anti-reflection layers 1011, 1013 each are mainly formed of niobium oxide, titanium oxide ($TiO_2$, $Ti_3O_5$, $Ti_2O_3$), zirconium oxide, aluminum oxide ($Al_2O_3$), silicon oxynitride or silicon nitride, and the second anti-reflective layers 1012, 1014 each are mainly formed of silicon oxide or magnesium fluoride.

Through the anti-reflection film 1010 disposed on the transparent substrate 100, the visual transparency of the composite substrate structure 50 is improved, such that the composite substrate structure 50 can have a transparency greater than about 92%. The impact of external light in the environment on the transparent substrate 100 is significantly reduced. The anti-reflection effect of the transparent substrate 100 is improved, and the optical property of the composite substrate structure 50 is reinforced.

In some embodiments, a middle layer 500 (not shown in FIG. 5) is selectively disposed between the diamond-like carbon layer 200 and the hydrophobic layer 300, whereby the hydrophobic layer 300 is firmly bonded to the diamond-like carbon layer 200.

Figure 6:
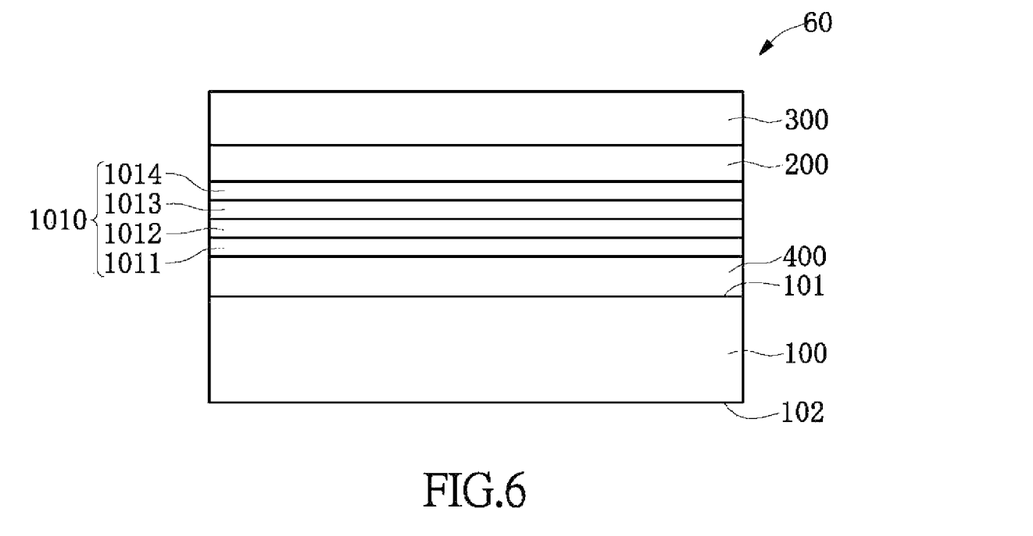
FIG. 6 shows a cross-sectional view of the composite substrate structure according to some embodiments of the present disclosure.

Refer to FIG. 6, which shows a cross-sectional view of the composite substrate structure according to one or more embodiments of the present disclosure. Components similar to those of FIG. 1 to FIG. 5 are not further described. In some embodiments, the composite substrate structure 60 further includes an adhesive layer 400 disposed between the transparent substrate 100 and the anti-reflection film 1010, in which the first anti-reflection layer 1011 is arranged adjacent to the adhesive layer 400, and the second anti-reflection layer 1014 is arranged adjacent to the diamond-like carbon layer 200.

In some embodiments, a middle layer 500 (not shown in the FIG. 6) is selectively disposed between the diamond-like carbon layer 200 and the hydrophobic layer 300, whereby the hydrophobic layer 300 is firmly bonded to the diamond-like carbon layer 200.

Figure 7:
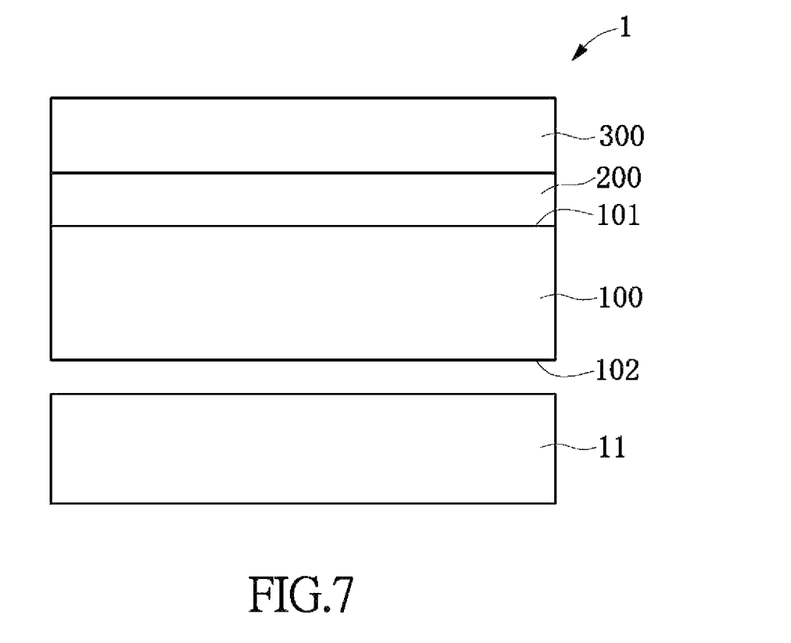
FIG. 7 shows a cross-sectional view of a touch panel having composite substrate structure of FIG. 1 in accordance with various embodiments of the present disclosure.

Refer to FIG. 7, which shows a cross-sectional view of a touch panel having composite substrate structure of FIG. 1 in accordance with various embodiments of the present disclosure. As shown in FIG. 7, the touch panel 1 includes a transparent substrate 100 having a first face 101 and a second face 102 parallel to the first face 101. The transparent substrate 100 is made of insulating and visually transparent materials. The transparent substrate 100 is formed of a material including ethylene terephthalate, polyether sulfone, polyacrylate, polyethylene naphthalate, polyethylene terephthalate, polyphenylene sulfide, polyallylate, polycarbonate, polyethylene terephthalate polyethylene terephthalate, glass or the like. The transparent substrate 100 is a stiff plate or a pliable plate. The transparent substrate 100 is a flat board, a curved board, or in different shapes. In some embodiments, the transparent substrate 100 is, as a specific example, a flat board.

The touch panel 1 further includes a diamond-like carbon layer 200 formed on the transparent substrate 100. The following only describes a specific example of the present embodiment, in which the diamond-like carbon layer 200 is positioned on the first face 101 of the transparent substrate 100. It is preferred that, the diamond-like carbon layer 200 is positioned on the first face 101 for the following reasons. The touch panel 1 is configured to apply to a touch control electronic device (such as a smart phone or a table computer). In the touch panel 1 assembled with other components for forming a touch control electronic device, the first face 101 of the transparent substrate 100, where a touch by the user is conducted to operate the touch control electronic device, needs to be exposed, while the other faces of the transparent substrate 100 are covered by the other components. When a touch by the user is conducted, an external force may result in scratches or cavities on the first face 101. The diamond-like carbon layer 200 laminated on the first face 101 is configured for protecting the first face 101 from scratches or cavities. In some embodiments, the diamond-like carbon layer 200 is laminated on other faces of the transparent substrate 100. For example, the diamond-like carbon layer 200 disposed on the transparent substrate 100 is positioned under the second face 102, and the present disclosure is not limited thereto.

In particular, the diamond-like carbon layer 200 of the touch panel 1 is designed to meet the needs of its application on the touch panel. At least two considerations are contemplated herein:

First, the diamond-like carbon layer 200 can have $sp^2$ bond graphite structures and $sp^3$ bond diamond cubic structures. The $sp^3$ bonds diamond cubic structure has better hardness, better scratch resistance, and better wear resistance, while has relatively high internal stress and poor adhesion with the transparent substrate 100. Thus, the process of forming a diamond-like carbon layer 200 on the transparent substrate 100 promotes the adhesion of the diamond-like carbon layer 200 with respect to the transparent substrate 100. For example, the thickness of the diamond-like carbon layer 200 formed on the transparent substrate 100 is decreased to reduce the internal stress thereof.

Second, considering the visual transparency of the diamond-like carbon layer 200, the $sp^2$ bond graphite structure has a greater impact on the optical properties of the diamond-like carbon layer 200 than the $sp^3$ bond diamond cubic structure. Specifically, the more graphite structures having $sp^2$ bonds contained in the diamond-like carbon layer 200, the poorer the visual transparency of the diamond-like carbon layer 200 is. The fewer graphite structures having $sp^2$ bonds contained in the diamond-like carbon layer 200, the better the visual transparency of the diamond-like carbon layer 200 is.

Therefore, to optimize the adhesion and the visual transparency, it is preferred that, the diamond-like carbon layer 200 has thickness less than or equal to about 15 nanometers and has a content percentage of $sp^3$ bonds greater than or equal to about 15%. The content percentage of $sp^3$ bonds of the diamond-like carbon layer 200 is, as a specific example, about 30% or about 50% according to needs.

In some embodiments, the diamond-like carbon layer 200 according to the present disclosure is formed on the surface of the transparent substrate 100 by sputtering. The content percentage of $sp^3$ bonds in the diamond-like carbon layer 200 is regulated by controlling the flow rate of hydrogen and the dissociation energy. The diamond-like carbon layer 200 formed by sputtering can have a content percentage of $sp^3$ bonds greater than or equal to about 15% when the flow rate of hydrogen is controlled to grater then 12 sccm (standard cubic centimeter per minute) and the dissociation energy is controlled to 100 to 700 eV (electron volt).

It is worth mentioning that, in addition to the visual transparency and the adhesion, according to the present disclosure, there are further considerations directed to the visual effect of the touch panel 1.

The visual effect of the touch panel 1 is related at least to the thickness of the diamond-like carbon layer 200. Experimental results show that the greater the thickness of the diamond-like carbon layer 200 of the touch panel 1, the poorer the visual transparency of the touch panel 1, and the more apparent the appearance yellow color, which is known as a yellowing phenomenon in the related field. The yellowing phenomenon is seen by a naked eye if the thickness of the diamond-like carbon layer 200 is increased to greater than about 10 nanometers. The yellowing phenomenon is so serious that the visually effect of the touch panel 1 is affected, if the thickness of the diamond-like carbon layer 200 is increased to greater than about 15 nanometers.

Therefore, considering the visual transparency, the adhesion, and the yellowing phenomenon, in some embodiments, the diamond-like carbon layer 200 has a preferred thickness of less than about 10 nanometers. In another preferred embodiment, the diamond-like carbon layer 200 can have a thickness ranging from about 2 nanometers to about 5 nanometers, resulting to a transparency of the touch panel greater than about 89%, and enabling the optimization of the visual effect and the adhesion property of the touch panel 1. Transparency here and in the following is described as the amount of light transmitted divided by the amount of incident light times 100%, where the wavelength of the incident light is about 550 nanometers.

The touch panel 1 further includes a hydrophobic layer 300 disposed at a side of the diamond-like carbon layer 200 opposite to the transparent substrate 100. A surface of the hydrophobic layer 300 opposite to the diamond-like carbon layer 200 has a contact angle greater than 110 degrees. Thus, at the side opposite to the diamond-like carbon layer 200, the entire surface of the hydrophobic layer 300 can exhibit a preferred hydrophobic property. (Experiment results show that when the contact angle of a surface of an object is greater than 90 degrees, the surface of the object is seemingly repelled from a mass of liquid i.e., liquid does not easily wet the object and is easy to move on the surface thereof.) The material of the hydrophobic layer 300 is selected from the group consisting of fluorine, nitrogen, oxygen, and mixtures thereof, for improving the hydrophobicity of the touch panel 1.

The following describes a first scratch resistance and wear resistance test carried out on the touch panel 1 having the hydrophobic layer 300 and a touch panel without a hydrophobic layer 300, respectively:

Experimental Conditions:

Use a 2 cm by 2 cm friction head wrapped with an ultra-fine steel wool under a force of 70N for testing.

Experimental Results:

After the scratching is performed 6000 times, the touch panel without a hydrophobic layer 300 has serious abrasion.

After the scratching is performed 8000 times, the transparent substrate 100 has serious abrasion, and the contact angle of the hydrophobic layer 300 remains greater than 90 degrees, exhibiting a preferred hydrophobic property.

Experimental Results Show:

The touch panel 1 having the hydrophobic layer 300 has a coefficient of surface friction less than that of the touch panel without a hydrophobic layer 300. The scratch resistance and the wear resistance of the touch panel are related to the coefficient of surface friction. Specifically, the greater the coefficient of surface friction of the touch panel, the poorer the scratch resistance and the wear resistance; the less the coefficient of surface friction of the touch panel, the better the scratch resistance and the wear resistance.

Accordingly, the hydrophobic layer 300 improves the hydrophobicity of the touch panel 1, thus preventing the surface of the touch panel 1 from attracting oil or water. In addition, the touch panel 1 having the hydrophobic layer 300 has a smaller coefficient of surface friction, resulting in fewer scratching and less wear when the touch panel is subjected to an external scratching force.

The greater the content percentage of hydrophobic atoms in the hydrophobic layer 300, the better the hydrophobicity of hydrophobic atoms in the hydrophobic layer 300, and thus the smaller the coefficient of surface friction. According to one or more embodiments of the present disclosure, the hydrophobic layer 300 has a content percentage of hydrophobic atoms (such as fluorine) greater than about 50%.

Moreover, it is found in the actual production process that, the coefficient of surface friction of the hydrophobic layer 300 is related to a proportion of carbon-fluorine bonds to silicon-oxygen bonds therein.

The following describes a second scratch resistance and wear resistance test carried out on the touch panel 1 having the hydrophobic layer 300 of various proportions of carbon-fluorine bonds to silicon-oxygen bonds therein:

Experiment Conditions:

Dispose a dustless class 100 cloth on the touch panel, and then dispose a 200-gram weight on the dustless cloth. Perform the scratch resistance and wear resistance test under a velocity of 100 mm/min for the touch panel.

Experimental Results:

The touch panel with a proportion of carbon-fluorine bonds to silicon-oxygen bonds greater than or equal to 50:1 in the hydrophobic layer 300 has a coefficient of static friction less than or equal to about 0.1. The surface of the hydrophobic layer 300 has a preferred smoothness, and the scratch resistance and wear resistance thereof are improved.

Experimental Results Show:

The hydrophobic layer 300 improves the surface smoothness of the touch panel, thus enhancing the scratch resistance and the wear resistance of the touch panel that is subjected to an external force of scratching.

In the present embodiment, the hydrophobic layer 300 can become crystalline by a baking process or the like. In the hydrophobic layer 300 formed by a baking process, molecules are arranged in a highly ordered microscopic structure, such that the hydrophobic layer 300 can have a preferred density. The greater density of the hydrophobic layer 300 keeps the coefficient of friction of the hydrophobic layer 300 more stable and in a low value. The touch panel 1 with the hydrophobic layer 300 that has a crystal proportion greater than about 50% can have a significantly improved scratch resistance or wear resistance.

Moreover, the greater the thickness of the hydrophobic layer 300, the poorer the visual transparency thereof. To optimize the hydrophobicity and the visual transparency, it is preferred that, the hydrophobic layer 300 according to the present embodiment has a thickness ranging from about 5 nanometers to about 30 nanometers.

The following describes other embodiments of composite substrate structures according to the present disclosure. The composite substrate structure 20, the composite substrate structure 30, and the composite substrate structure 40 can all be applied to a touch panel 1, thus to improve the scratch resistance or the wear resistance of the touch panel 1 and to optimize the optical effect thereof. Components and implements similar to those of FIG. 1 to FIG. 6 are not further described.

Figure 8:
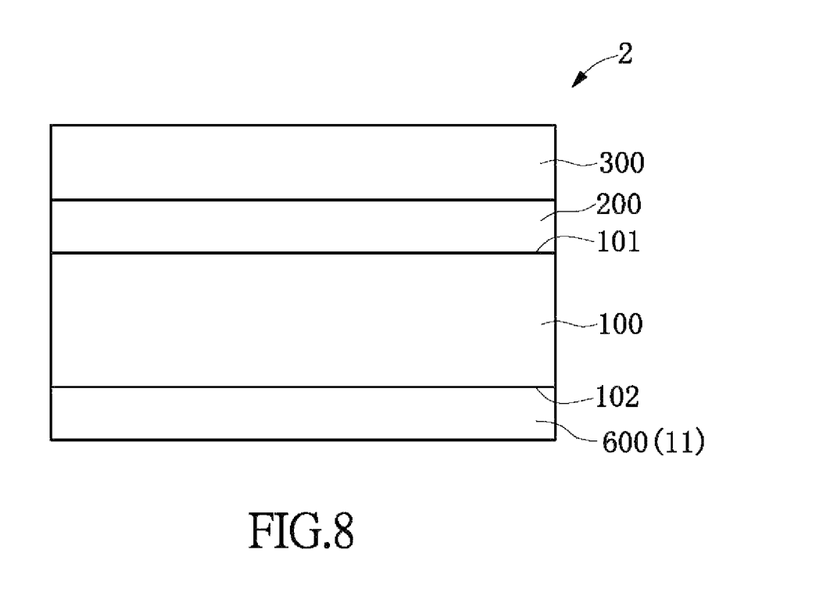
FIG. 8 shows a cross-sectional view of the touch panel having composite substrate structure of FIG. 1 in accordance with various embodiments of the present disclosure.

FIG. 8 shows a cross-sectional view of the touch panel having composite substrate structure of FIG. 1 in accordance with various embodiments of the present disclosure. The touch panel 2 includes a touch control unit 11, and the touch control unit 11 includes a touch sensing electrode layer 600 disposed at the second face 102 of the transparent substrate 100. The touch sensing electrode layer 600 is configured to facilitate the operation of touch control by the user. The touch sensing electrode layer 600 is formed of visual transparent conductive materials such as indium tin oxide (ITO), indium zinc oxide (IZO), cadmium tin oxide (CTO), aluminum zinc oxide (AZO), indium tin zinc oxide (ITZO), zinc oxide, cadmium oxide (CdO), hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO), silver nanowires, carbon nanotubes, graphene, and the like.

The touch sensing electrode layer 600 is formed with a plurality of first-axis electrodes (not shown in Figures) and a plurality of second-axis electrodes. In one or more embodiments, the first-axis electrodes and the second-axis electrodes are both disposed on the second face 102 of the transparent substrate 100.

Figure 9:
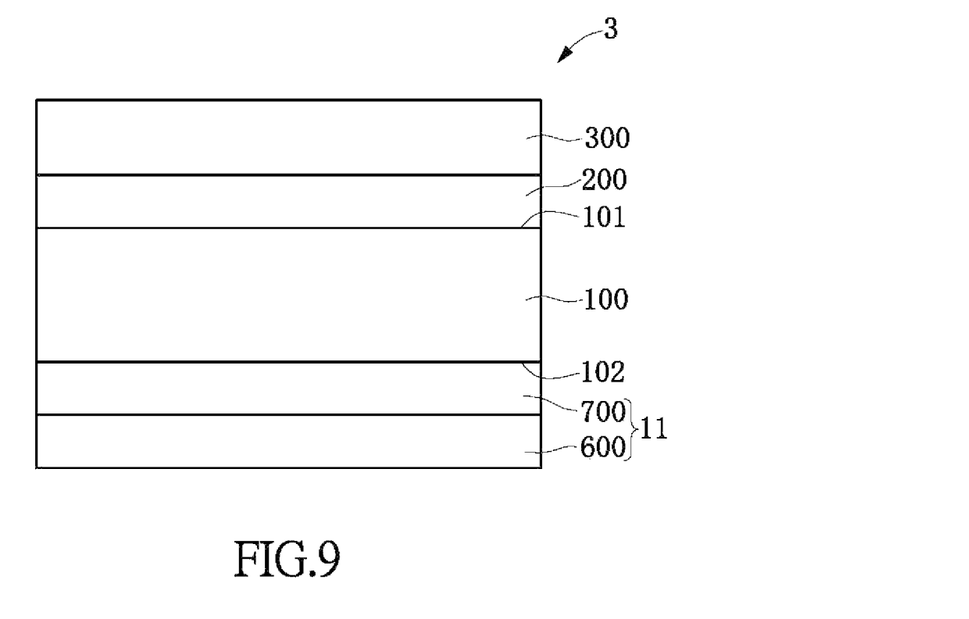
FIG. 9 shows a cross-sectional view of the touch panel having composite substrate structure of FIG. 1 in accordance with various embodiments of the present disclosure.

FIG. 9 shows a cross-sectional view of the touch panel having composite substrate structure of FIG. 1 in accordance with various embodiments of the present disclosure. In some embodiments, the touch control unit 11 of the touch panel 3 includes a first supporting substrate 700 positioned under the transparent substrate 100. The touch sensing electrode layer 600 is disposed on the first supporting substrate 700. The touch sensing electrode layer 600 is formed with a plurality of first-axis electrodes (not shown in Figures) and a plurality of second-axis electrodes. In some embodiments, the first-axis electrodes and the second-axis electrodes are both disposed on the same face of the first supporting substrate 700. In some embodiments, the first-axis electrodes is disposed on a lower face of the first supporting substrate 700, and the second-axis electrodes is disposed on an upper face of the first supporting substrate 700, or vice versa. In some embodiments, the first-axis electrodes is disposed on the second face 102 of the transparent substrate 100 and the second-axis electrodes is disposed on a face parallel with the second face 102 of the transparent substrate 100.

Figure 10:
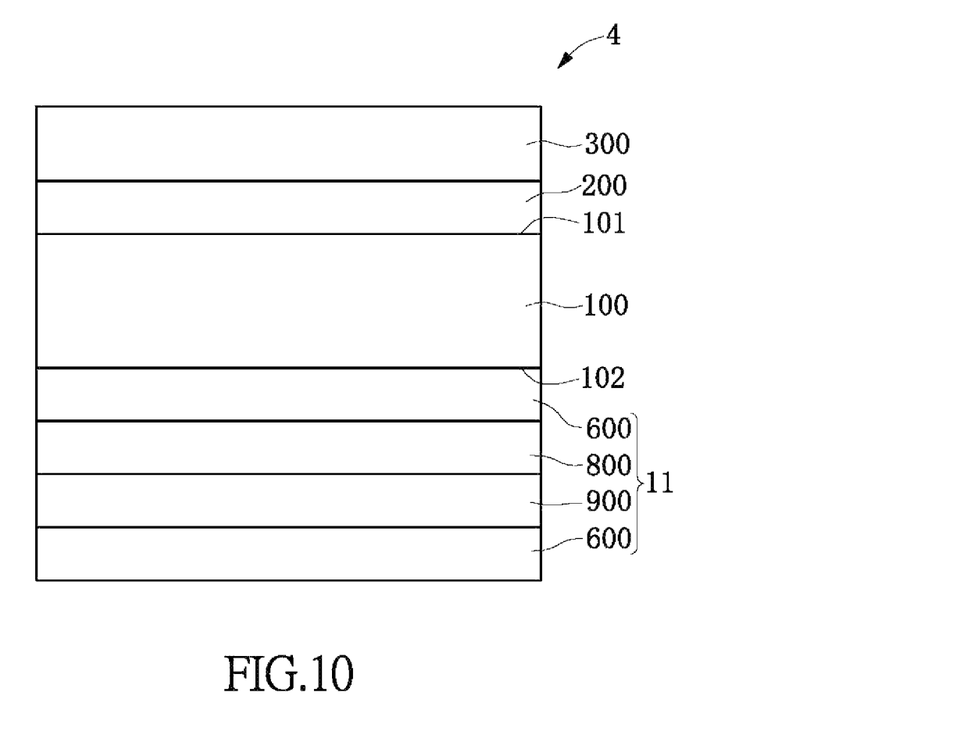
FIG. 10 shows a cross-sectional view of the touch panel having composite substrate structure of FIG. 1 in accordance with various embodiments of the present disclosure.

FIG. 10 shows a cross-sectional view of the touch panel having composite substrate structure of FIG. 1 in accordance with various embodiments of the present disclosure. In some embodiments, the touch panel 4 further includes a second supporting substrate 800 and a third supporting substrate 900. The second supporting substrate 800 is positioned under the transparent substrate 100, and the third supporting substrate 900 is positioned under the second supporting substrate 800. The first-axis electrodes (or the second-axis electrodes) of the touch sensing electrode layer 600 are disposed on the lower face (or the upper face) of the second supporting substrate 800, while the second-axis electrodes (or the first-axis electrodes) of the touch sensing electrode layer 600 are disposed on a face parallel with the lower face (or the upper face) of the second supporting substrate 800.

The first supporting substrate 700, the second supporting substrate 800, and the third supporting substrate 900 each is made of insulating and visually transparent materials, and is formed of a material including ethylene terephthalate, polyether sulfone, polyacrylate, polyethylene naphthalate, polyethylene terephthalate, polyphenylene sulfide, polyallylate, polycarbonate, polyethylene terephthalate polyethylene terephthalate, glass or the like. In addition, the first supporting substrate 700, the second supporting substrate 800, and the third supporting substrate 900 each is a flat board, a curved board, or in different shapes.

According to the embodiments of the present disclosure, a composite substrate structure and a touch panel having composite substrate structure are provided, in which the scratch resistance and the wear resistance of the transparent substrate is promoted. Moreover, the touch panel having composite substrate structure provided can have a preferred abrasion resistance, transparency and visual effect.

The composite substrate structure according to the embodiments of the present disclosure is not limited to operating as a touch surface of a touch panel and is also highly applicable to various other products. For example, the composite substrate structure is used as a wear-resistant surface of other optical devices, such as a front lens of a camera.

Further, when the product does not require transparency, instead of the transparent substrate, a metal plate or a opaque plastic plate is applied to the composite substrate structure of the present disclosure, and used as a wear-resistant surface of the casing of various products, such as a side casing or a back cover of a cell phone, a outer casing of computers, cameras, or a home appliance, according to need.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:
1. A composite substrate structure, comprising:
a transparent substrate;
a hydrophobic layer disposed on the transparent substrate;
a diamond-like carbon layer disposed between the transparent substrate and the hydrophobic layer; and
a middle layer disposed between the diamond-like carbon layer and the hydrophobic layer, wherein:
a surface of the middle layer abuts a surface of the diamond-like carbon layer at a bonding interface,
the middle layer is formed of a silicon carbon based material, and the hydrophobic layer has a coefficient of static friction less than or equal to about 0.1.

2. The composite substrate structure of claim 1, wherein the hydrophobic layer is crystalline, and the hydrophobic layer has a crystal proportion greater than about 50%.

3. The composite substrate structure of claim 1, wherein a first surface of the hydrophobic layer opposite to a second surface the hydrophobic layer that faces the diamond-like carbon layer has a contact angle greater than 110 degrees.

4. The composite substrate structure of claim 1, wherein the hydrophobic layer has a thickness ranging from about 5 nanometers to about 30 nanometers.

5. The composite substrate structure of claim 1, wherein the diamond-like carbon layer has a thickness less than or equal to about 10 nanometers.

6. The composite substrate structure of claim 1, wherein the diamond-like carbon layer has a content percentage of spa bonds greater than or equal to about 15%.

7. The composite substrate structure of claim 1, further comprising an adhesive layer, wherein:
the adhesive layer is disposed between the transparent substrate and the diamond-like carbon layer, and
the adhesive layer includes a silicon-based material.

8. The composite substrate structure of claim 7, wherein the adhesive layer has a thickness ranging from about 5 nanometers to about 10 nanometers.

9. The composite substrate structure of claim 1, further comprising an anti-reflection film disposed between the transparent substrate and the diamond-like carbon layer.

10. The composite substrate structure of claim 9, wherein:
the anti-reflection film comprises a plurality of first anti-reflection layers and a plurality of second anti-reflection layers,
each second anti-reflection layer of the plurality of second anti-reflection layers has a refractive index less than that of each first anti-reflection layer of the plurality of first anti-reflection layers,
the number of first anti-reflection layers that define the plurality of first anti-reflection layers corresponds to the number of second anti-reflection layers that define the plurality of second anti-reflection layers, and
the first anti-reflection layers and the second anti-reflection layers are alternately laminated.

11. The composite substrate structure of claim 10, wherein:
each first anti-reflection layer of the plurality of first anti-reflection layers has a refractive index greater than about 1.6, and
each second anti-reflection layer of the plurality of second anti-reflection layers has a refractive index less than about 1.55.

12. The composite substrate structure of claim 10, wherein:
one first anti-reflection layer of the plurality of first anti-reflection layers is arranged adjacent to the transparent substrate, and
one second anti-reflection layer of the plurality of second anti-reflection layers is arranged adjacent to the diamond-like carbon layer.

13. The composite substrate structure of claim 10, further comprising an adhesive layer disposed between the transparent substrate and the anti-reflection film, wherein:
one first anti-reflection layer of the plurality of first anti-reflection layers is arranged adjacent to the adhesive layer, and
one second anti-reflection layer of the plurality of second anti-reflection layers is arranged adjacent to the diamond-like carbon layer.

14. The composite substrate structure of claim 10, wherein:
each of the plurality of first anti-reflection layers is mainly formed of niobium oxide, titanium oxide, zirconium oxide, aluminum oxide, silicon oxynitride or silicon nitride, and
each of the plurality of second anti-reflective layers is mainly formed of silicon oxide or magnesium fluoride.

15. The composite substrate structure of claim 1, wherein the middle layer has a content percentage of silicon atoms ranging from about 10% to about 20% and a content percentage of carbon atoms ranging from about 80% to about 90%.

16. A touch panel having composite substrate structure, comprising:
a transparent substrate having a first face and a second face parallel to the first face;
a diamond-like carbon layer disposed on the transparent substrate and positioned on the first face;
a hydrophobic layer disposed at a side of the diamond-like carbon layer opposite to the transparent substrate;
a middle layer disposed between the diamond-like carbon layer and the hydrophobic layer, wherein:
a surface of the middle layer abuts a surface of the diamond-like carbon layer at a bonding interface, and
the middle layer is formed of a silicon carbon based material; and
a touch control unit disposed under the second face of the transparent substrate, wherein the hydrophobic layer has a coefficient of kinetic friction less than or equal to about 0.1 with respect to a dustless cloth.

17. The touch panel of claim 16, wherein the touch control unit comprises a touch sensing electrode layer disposed at the second face of the transparent substrate.

18. The touch panel of claim 16, wherein the touch control unit comprises a first supporting substrate positioned under the second face of the transparent substrate.

19. The touch panel of claim 18, wherein the touch control unit further comprises a touch sensing electrode layer disposed on the first supporting substrate.

20. The touch panel of claim 16, wherein:
the touch control unit comprises a second supporting substrate and a third supporting substrate,
the second supporting substrate is positioned under the second face of the transparent substrate, and
the third supporting substrate is positioned under the second supporting substrate.

* * * * *